United States Patent
Tayart De Borms et al.

(10) Patent No.: US 9,651,707 B2
(45) Date of Patent: May 16, 2017

(54) METHODS AND SYSTEMS FOR JOINT SEISMIC AND ELECTROMAGNETIC DATA RECORDING

(71) Applicant: CGG SERVICES SA, Massy (FR)

(72) Inventors: Brice Tayart De Borms, Paris (FR); Charles Boulanger, Orsay (FR); Baptiste Rondeleux, Paris (FR); Jean-Jacques Postel, Paris (FR)

(73) Assignee: CGG SERVICES SAS, Massy (FR)

( * ) Notice: Subject to any disclaimer, the term of this patent is extended or adjusted under 35 U.S.C. 154(b) by 331 days.

(21) Appl. No.: 14/314,115

(22) Filed: Jun. 25, 2014

(65) Prior Publication Data

US 2015/0002158 A1    Jan. 1, 2015

Related U.S. Application Data (60) Provisional application No. 61/840,789, filed on Jun. 28, 2013.

(51) Int. Cl.

| | | |
|---|---|---|
| G01V 3/08 | (2006.01) |
| G01V 3/12 | (2006.01) |
| G01V 3/36 | (2006.01) |
| G01V 1/24 | (2006.01) |
| G01V 3/00 | (2006.01) |
| G01V 3/28 | (2006.01) |
| G01V 3/26 | (2006.01) |
| G01V 11/00 | (2006.01) |

(52) U.S. Cl.
CPC ............. *G01V 3/36* (2013.01); *G01V 1/247* (2013.01); *G01V 3/00* (2013.01); *G01V 3/081* (2013.01); *G01V 3/12* (2013.01); *G01V 3/26* (2013.01); *G01V 3/28* (2013.01); *G01V 11/00* (2013.01); *G01V 3/08* (2013.01); *G01V 3/083* (2013.01); *G01V 2003/084* (2013.01)

(58) Field of Classification Search
CPC ... G01V 3/08; G01V 3/26; G01V 3/28; G01V 3/081; G01V 3/00; G01V 2003/084; G01V 3/083; G01V 3/10
USPC .................................................. 324/323–375
See application file for complete search history.

(56) References Cited

U.S. PATENT DOCUMENTS

| | | |
|---|---|---|
| 3,292,728 A | 12/1966 | Ehrlich |
| 3,646,357 A | 2/1972 | Grace |
| 4,904,942 A | 2/1990 | Thompson |
| 6,462,549 B1 | 10/2002 | Curtis et al. |
| 6,735,630 B1 | 5/2004 | Gelvin et al. |

(Continued)

FOREIGN PATENT DOCUMENTS

| | | |
|---|---|---|
| WO | 2005/085909 A1 | 9/2005 |
| WO | 2012/052770 A2 | 4/2012 |
| WO | 2012/053902 A1 | 4/2012 |

OTHER PUBLICATIONS

S. Tufekci, "Combined Surface-Wave and Resistivity Imaging for Shallow Subsurface Characterization", A thesis presented to the faculty of the College of Arts and Sciences of Ohio University, Aug. 2009, pp. 1-152.

*Primary Examiner* — Huy Q Phan
*Assistant Examiner* — Raul Rios Russo
(74) *Attorney, Agent, or Firm* — Patent Portfolio Builders PLLC (57) ABSTRACT

Methods and data acquisition systems enable joint acquisition of seismic and electromagnetic data in a target area using stand-alone digital recorders.

20 Claims, 6 Drawing Sheets

(56) References Cited

U.S. PATENT DOCUMENTS

| | | |
|---|---|---|
| 6,739,165 B1 | 5/2004 | Strack |
| 7,328,107 B2 | 2/2008 | Strack et al. |
| 7,330,790 B2 | 2/2008 | Berg |
| 7,340,348 B2 | 3/2008 | Strack et al. |
| 7,388,382 B2 | 6/2008 | Strack et al. |
| 7,446,535 B1 | 11/2008 | Tenghamn et al. |
| 7,453,763 B2 | 11/2008 | Johnstad |
| 7,567,084 B2 | 7/2009 | Eidesmo et al. |
| 7,574,410 B2 | 8/2009 | Strack |
| 7,705,599 B2 | 4/2010 | Strack et al. |
| 7,805,250 B2 | 9/2010 | Colombo et al. |
| 8,055,730 B2 | 11/2011 | Brady et al. |
| 8,098,542 B2 | 1/2012 | Hillesund et al. |
| 8,170,802 B2 | 5/2012 | Knutsen |
| 8,335,126 B2 | 12/2012 | Sudow et al. |
| 8,347,658 B2 | 1/2013 | Thompson et al. |
| 2003/0098149 A1 | 5/2003 | Wellington et al. |
| 2005/0184260 A1 | 8/2005 | Fageraas et al. |
| 2006/0238200 A1* | 10/2006 | Johnstad ............ G01V 1/201 324/337 |
| 2007/0150200 A1 | 6/2007 | Charara et al. |
| 2008/0079723 A1 | 4/2008 | Hanson et al. |
| 2008/0265895 A1* | 10/2008 | Strack ............ G01V 3/083 324/347 |
| 2008/0265896 A1* | 10/2008 | Strack ............ G01V 3/12 324/350 |
| 2009/0265111 A1* | 10/2009 | Helwig ............ G01V 3/12 702/7 |
| 2010/0014384 A1 | 1/2010 | Colombo et al. |
| 2010/0017138 A1* | 1/2010 | Brady ............ G01V 1/22 702/14 |
| 2011/0158043 A1 | 6/2011 | Johnstad |
| 2012/0081995 A1* | 4/2012 | Hillesund ............ G01V 1/38 367/16 |
| 2012/0130644 A1* | 5/2012 | Eick ............ G01V 11/002 702/14 |
| 2012/0161774 A1 | 6/2012 | Strack et al. |
| 2012/0191352 A1* | 7/2012 | Kjerstad ............ G01V 3/12 702/6 |
| 2012/0253680 A1* | 10/2012 | Thompson ............ G01V 11/007 702/13 |
| 2013/0297295 A1 | 11/2013 | Georgiev et al. |
| 2014/0043935 A1 | 2/2014 | Cloud |

* cited by examiner

METHODS AND SYSTEMS FOR JOINT SEISMIC AND ELECTROMAGNETIC DATA RECORDING

CROSS REFERENCE TO RELATED APPLICATIONS

This application claims priority and benefit from U.S. Provisional Patent Application No. 61/840,789, filed Jun. 28, 2013, for "Joint Seismic and Electromagnetic Recording," the content of which is incorporated in its entirety herein by reference.

BACKGROUND

Technical Field

Embodiments of the subject matter disclosed herein generally relate to investigating an underground formation by simultaneously measuring its seismic and electromagnetic response to excitations or, more specifically, to jointly recording seismic and electromagnetic data.

Discussion of the Background

Reflection seismology is a popular method of exploring an underground formation by injecting seismic excitations into the formation and measuring the formation's response to them. Electromagnetic methods have been used to provide complementary information to information extracted using seismic methods. Electromagnetic methods are particularly efficient in differentiating rock layers that contain hydrocarbons from other, non-oil-bearing rock layers due to the large resistivity contrast. Contrasts of 1:2 or even 1:10 are common between an oil-saturated and a brine-saturated reservoir rock.

Conventionally, seismic and electromagnetic surveys are performed at different times, with electromagnetic data acquisition system being deployed and operated independently from seismic data acquisition.

Recently, time-lapse surveys have been used with increasing frequency to track the evolution of underground formations including hydrocarbon reservoirs by exploring their structure at long time intervals of months or even years. In order to minimize the changes of data acquisition systems that may be difficult to differentiate from the sought-after underground formations' changes, receivers and sources are sometimes kept in place for months or even years above the underground formation between surveys. In this context, it is necessary to deploy electromagnetic data acquisition while the seismic data acquisition system remains in place or vice-versa. Deployment and/or retrieval of equipment without damaging a co-located seismic or electromagnetic survey setup may be challenging and therefore time consuming.

Conventional seismic systems using moving coil sensors and wire-based data transmission (analog or digital) are affected by interference due to electromagnetic sources used for electromagnetic exploration of the subsurface. Therefore, traditionally, the seismic and electromagnetic surveys have been performed at different times. Consecutive seismic and electromagnetic surveys require substantial time during data acquisition and then during processing to properly combine complementary seismic and electromagnetic information.

Accordingly, it is desirable to provide a data acquisition system for both seismic and electromagnetic surveys that would shorten overall deployment, data acquisition and data processing times, while facilitating combination of complementary seismic and electromagnetic information about the investigated underground structure and avoiding the electromagnetic interference problems of conventional systems.

SUMMARY

An underground solid formation is surveyed simultaneously by measuring its response to seismic and electromagnetic excitations. The data acquisition system is configured to jointly acquire seismic and electromagnetic data using stand-alone digital recorders some of which are connected to both an electromagnetic sensor and a seismic sensor.

According to an embodiment, there is a method for exploring an underground solid formation, which includes disposing seismic sensors and electromagnetic sensors according to a predetermined arrangement over the underground solid formation, and connecting the seismic and electromagnetic sensors to stand-alone digital recorders. The method further includes acquiring jointly seismic and electromagnetic data gathered by the stand-alone digital recorders. At least one of the disposing, connecting and acquiring are performed such that to minimize a seismic-electromagnetic cross-response.

According to another embodiment, there is a seismic and electromagnetic data acquisition system including seismic sensors and electromagnetic sensors disposed over a predetermined area. The system further includes a nodal recording system connected to the seismic sensors and to the electromagnetic sensors, and configured to acquire jointly seismic and electromagnetic data corresponding to a seismic response and to an electromagnetic response of a same underground formation beneath the predetermined area, to a seismic excitation and to an electromagnetic excitation, respectively. The seismic and electromagnetic data acquisition system is configured and operated to minimize a seismic-electromagnetic cross-response in the jointly acquired seismic and electromagnetic data.

According to yet another embodiment, there is a method for retrofitting a seismic data acquisition system including seismic sensors disposed in a predetermined area and connected to stand-alone digital recorders. The method includes disposing electromagnetic sensors interleaved with the seismic sensors, and connecting the electromagnetic sensors to a subset of the stand-alone digital recorders. The method further includes injecting seismic and electromagnetic excitations into a solid formation under the predetermined area, and jointly acquiring seismic and electromagnetic data corresponding to the seismic and electromagnetic excitations emerging from the solid formation and detected by the seismic and electromagnetic sensors, using the stand-alone digital recorders. At least one of the disposing, connecting, injecting and acquiring are performed such that to minimize a seismic-electromagnetic cross-response.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a land data acquisition system. However, similar embodiments and methods may be used for a marine data acquisition system.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments, seismic and electromagnetic sensors are disposed over a predetermined area to explore a targeted underground solid formation. The sensors are connected to stand-alone digital recorders so as to allow acquiring jointly seismic and electromagnetic data.

Figure 1:
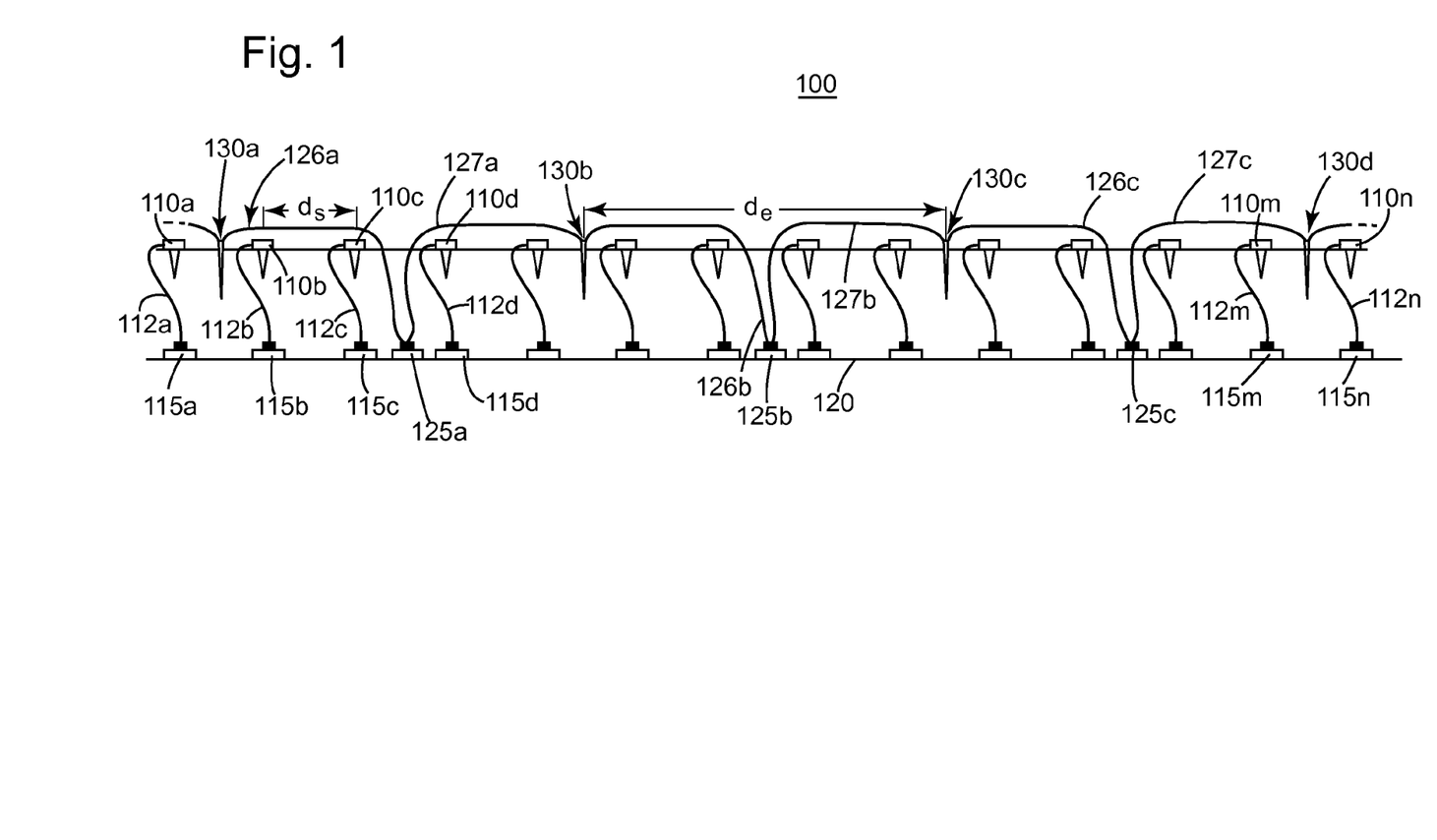
FIG. 1 illustrates a representative portion of a seismic and electromagnetic data acquisition system according to an embodiment.

FIG. 1 illustrates a representative portion of a seismic and electromagnetic data acquisition system 100 according to an embodiment. System 100 includes seismic sensors 110a, 110b, 110c, 110d, (not all the seismic sensors are labeled in FIG. 1), 110m and 110n. The seismic sensors may be geophones, hydrophones, MEMS (micro electro-mechanical system) accelerometers, DAS (distributed acoustic sensors), fiber optic sensors or a combination thereof. Although in FIG. 1 the sensors are illustrated along a horizontal line, a person skilled in the art understands that the actual location is affected by landscape (i.e., varying altitude, vegetation, etc). The seismic sensors are arranged, for example, in a grid covering a predetermined area above the underground formation whose structure is being investigated.

The seismic sensors are connected to digital recorders 115a, 115b, 115c, 115d, (not all the digital recorders are labeled in FIG. 1), 115m and 115n by wires 112a, 112b, 112c, 112d, (again not all labeled in FIG. 1), 112m and 112n. The digital recorders are connected to a central recorder (not shown) via a cable 120. In order to minimize interference with the electromagnetic signals during data acquisition, the digital recorders may communicate with the central recorder outside the data acquisition time. The digital recorders are configured for a stand-alone manner of operation during the data acquisition.

System 100 further includes electromagnetic sensors, i.e., grounded electrodes 130a, 130b, 130c, 130d interleaved among the seismic sensors. The electromagnetic sensors may be grounded electrodes, e.g., inductive coils, fluxgate magnetometers, capacitive electrodes, etc. or a combination thereof. The distance between the electromagnetic sensors, $d_E$ (e.g., 50 m), is greater than the distance between the seismic sensors, $d_S$ (e.g., 12.5 m).

The manner of disposing, connecting and acquiring jointly seismic and electromagnetic data are performed such as to minimize a seismic-electromagnetic cross-response. For example, non-inductive seismic sensors may be used in order to avoid altering the seismic detection signal due to the electromagnetic excitation injected into the investigated underground formation or its reflection. Thus, preferably the seismic sensors are hydrophones, micro electro-mechanical system (MEMS) accelerometers, distributed acoustic sensor systems (DAS), fiber optic sensors or a combination thereof. Alternatively, the seismic sensors (or inductive parts thereof) may be shielded and/or arranged such as to be minimally disturbed by the direct or stronger among the electromagnetic waves.

Digital recorders 125a, 125b and 125c are configured and connected using wires 126a-c and 127a-c to record potential differences between grounded electrodes 130a and 130b, 130b and 130c, and 130c and 130d, respectively. The potential differences may be in the range of 10 µV to a few mV.

Figure 2:
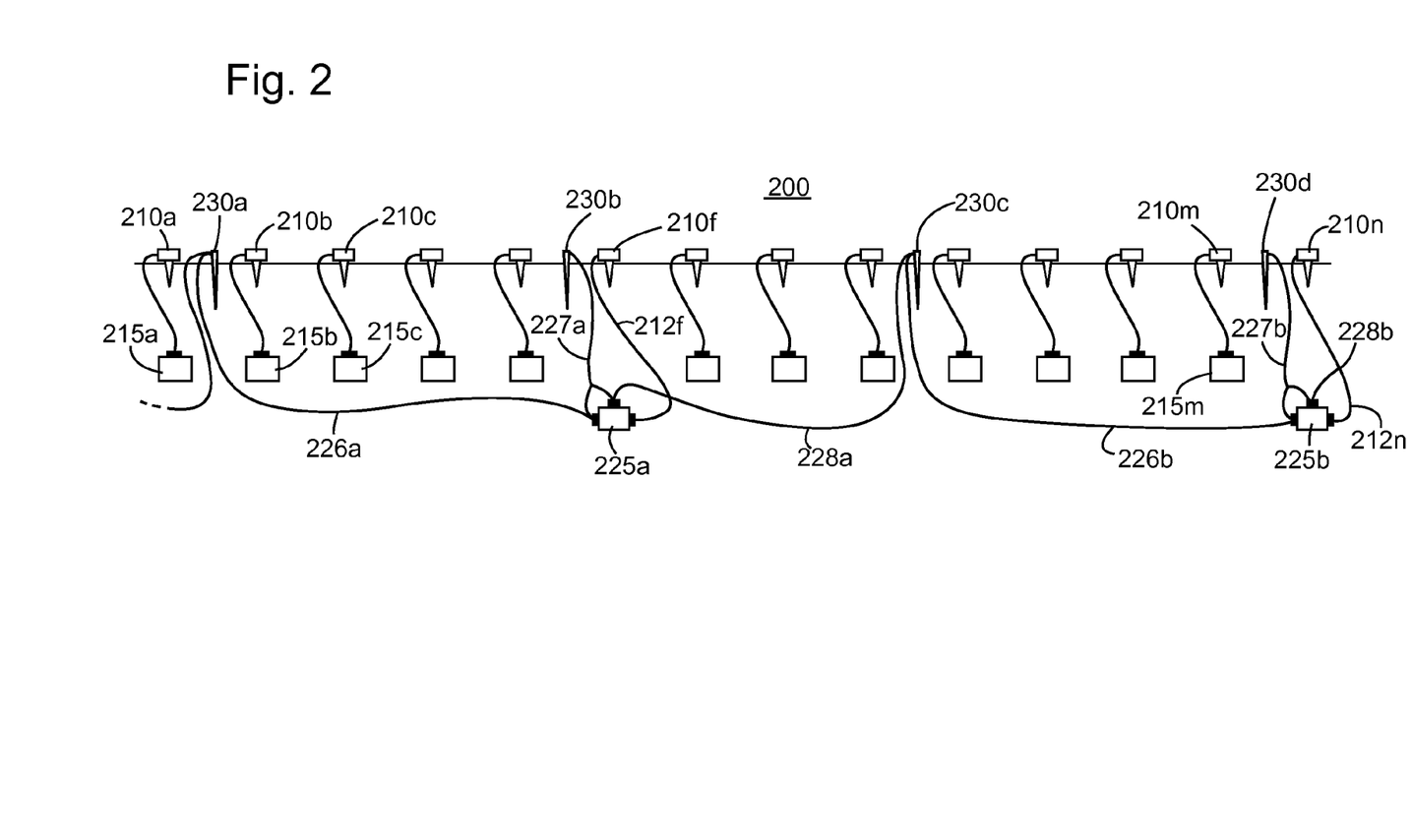
FIG. 2 illustrates a representative portion of a seismic and electromagnetic data acquisition system according to another embodiment.

FIG. 2 illustrates a representative portion of a seismic and electromagnetic data acquisition system 200 according to another embodiment. Unlike the seismic sensors in FIG. 1, seismic sensors 210a, 210b, 210c, 210f (not all the seismic sensors are labeled in FIG. 2), 210m and 210n are connected to wireless digital recorders 215a, 215b, 215c, . . . , 215m (i.e., digital recorders not connected to a central recorder via a cable). The digital recorders may be stand-alone recorders, i.e., they are able to record data without control or support from another device. The digital recorders may also form a nodal recording system, each node operating independently during data acquisition. Data stored by the digital recorders may be transferred in real time or near real time to a central unit or may be stored for subsequent harvesting. The data collected from all digital recorders is then assembled to generate a dataset, subject to complex data processing leading to images of the investigated underground structure. The digital recorders may be configured to transfer the data wirelessly.

Similar to system 100, system 200 further includes electromagnetic sensors, e.g., grounded electrodes 230a, 230b, 230c, 230d interleaved among the seismic sensors. All the sensor-related characteristics set forth above while describing system 100 remain valid for system 200 and are not repeated for brevity.

Unlike in FIG. 1, electromagnetic sensors 230a, 230b, 230c, 230d are connected to multichannel digital recorders 225a and 225b. These multichannel digital recorders are configured to record data related to two electromagnetic signals.

Multichannel digital recorder 225a is configured and connected using wires 226a, 227a and 228a to record electromagnetic data corresponding to potential differences between grounded electrodes 230a and 230b and between grounded electrodes 230b and 230c, respectively. Similarly, multichannel digital recorder 225b is configured and connected using wires 226b, 227b and 228b to record electromagnetic data corresponding to potential differences between grounded electrodes 230c and 230d, and between grounded electrodes 230d and another electrode not shown, respectively.

Multichannel digital recorders 225a and 225b are also configured and connected to record seismic data received from seismic sensors 210f and 210n, via wires 212f and 212n, respectively. By using this arrangement, fewer digital recorders are used, some of the digital recorders being configured as multichannel to receive and record both seismic and electromagnetic data.

The above-described arrangements may be left in place over long periods of time to monitor evolution of the underground formation by acquiring data continuously or periodically to observe changes in the explored structure. For example, an underground hydrocarbon reservoir may be monitored during production.

Figure 3:
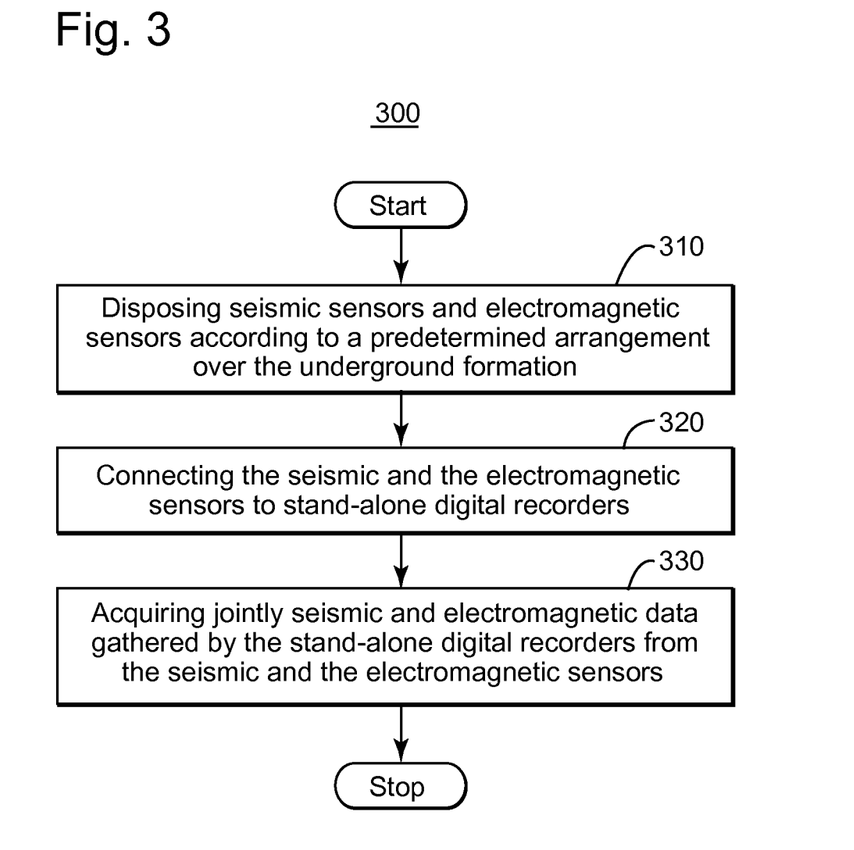
FIG. 3 is a flowchart of a method for exploring an underground solid formation according to an embodiment.

The above-described embodiments are configured and operated to perform a method for exploring an underground formation 300, whose flowchart is illustrated in FIG. 3. Method 300 includes disposing seismic sensors and electromagnetic sensors according to a predetermined arrangement over the underground formation, at 310. Further the method includes connecting the seismic and the electromagnetic sensors to stand-alone digital recorders at 320. Method 300 then includes acquiring jointly seismic and electromagnetic data gathered by the stand-alone digital recorders at 330. Thus, unlike conventional data acquisition systems, seismic and electromagnetic data acquisition systems allow joint (not consecutive) acquisition of seismic and electromagnetic data. At least one of the disposing, connecting and acquiring are performed such that to minimize a seismic-electromagnetic cross-response in the acquired data.

The seismic-electromagnetic cross-response may include a seismic sensor response to an electromagnetic excitation and/or an electromagnetic sensor response to a seismic excitation. Various techniques may be employed to minimize the seismic sensor response to an electromagnetic excitation, such as, using non-inductive seismic sensors and shielding the seismic sensors as already mentioned. However, other techniques related to the excitation sequence and listening time overlaps may also be designed to minimize the seismic-electromagnetic cross-response.

Figure 4:
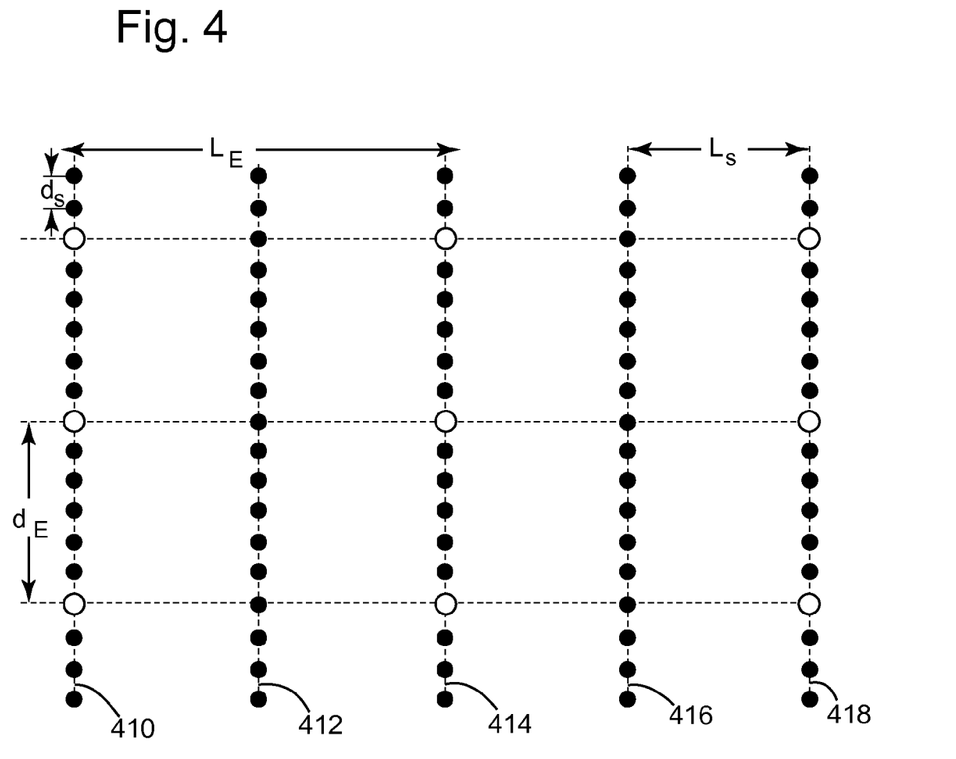
FIG. 4 illustrates seismic sensors and electromagnetic sensors arranged according to an embodiment.

As illustrated in FIG. 4, the seismic and electromagnetic sensors may be arranged along a same grid which (ideally, on a flat surface) includes lines 410, 412, 414, 416 and 418. In this embodiment, the electromagnetic sensors (marked by hollow larger circles in FIG. 4) are less frequent than the seismic sensors. Note that seismic sensors may also be located near the electromagnetic sensors. The inline (i.e., along lines 410-418) distance between seismic sensors $d_S$ is smaller than the inline distance between electromagnetic sensors $d_E$. Moreover, the crossline (i.e., perpendicular to lines 410-418) distance $L_S$ between seismic sensors (e.g., about 200 m) is smaller than the crossline distance $L_E$ between electromagnetic sensors. In other words, not all the lines include electromagnetic sensors.

Figure 5:
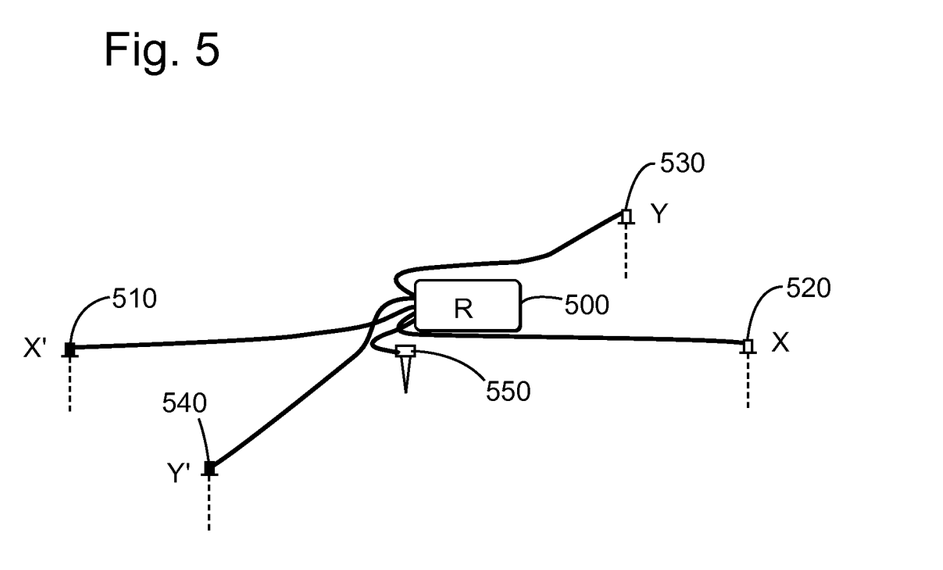
FIG. 5 illustrates a manner of connecting a multichannel digital recorder differently from the manner illustrated in FIG. 2.

Stand-alone digital recorders (not shown in FIG. 4 but see FIG. 2) are located near the sensors to form a nodal recording system configured and connected to record electromagnetic and seismic data. Different from the embodiment in FIG. 2 where digital recorders 225a and 225b receive signals from grounded electrodes arranged inline only, FIG. 5 illustrates a multichannel digital recorder 500 configured and connected to record potential differences between grounded electrodes 510 and 520 arranged inline (i.e., along one of the lines), and between electrodes 530 and 540 arranged crossline (i.e., perpendicular to the lines). Distance between electrodes 510 and 520 may be substantially equal to distance between electrodes 530 and 540, e.g., about 50 m. The corresponding electromagnetic data provides information about inline dipole X'X based on the electromagnetic data recorded via one channel of multichannel digital recorder 500, and information about crossline dipole Y'Y based on the electromagnetic data recorded via another channel of multichannel digital recorder 500. The electrode pairs (510 and 520, 530 and 540) measure orthogonal components of the electric field, across their respective locations. Note that multichannel digital recorder 500 also records seismic data received from seismic sensor 550 on a different channel. Since three-channel digital recorders are commercially available, the above-described embodiments illustrate multichannel digital recorders with three channels; however, the number of channels is not intended to be limiting.

In one embodiment, seismic and electromagnetic excitations are injected simultaneously into the underground solid formation because various techniques have been employed to minimize the seismic-electromagnetic cross-response. In this case, records stored by the digital recorders include both electromagnetic and seismic data.

In another embodiment, seismic and electromagnetic excitations are injected at different moments and/or different locations into the underground solid formation. The seismic sources that generate seismic excitations (known as "shots") may be carried on trucks to be moved from one shot location to another as described in U.S. Patent Application publication 2014/0043935, the content of which is incorporated herein by reference. Trucks carrying seismic sources may also carry electromagnetic sources. Alternatively, the electromagnetic sources may also be carried separately from the seismic source by another vehicle. However, the electromagnetic sources may also be buried below electromagnetic sensors, as described in U.S. Patent Application publication 2013/0297295, the content of which is incorporated herein by reference.

In one embodiment, the digital recorders are configured to record continuously. In this case, records include the absolute times. A GPS (global positioning system) time recorded when an excitation is generated allows matching the records with the excitations.

In another embodiment, the digital recorders are configured to record temporarily, after the seismic and/or electromagnetic excitations are injected into the underground solid formation (e.g., the beginning of a predetermined recording period is triggered by a seismic and/or electromagnetic excitation being generated). Further, the digital recorders may also be configured to follow the injection pattern (for seismic or electromagnetic excitations), such that the overlap of seismic and electromagnetic reflections is minimized or reduced, or to record based on a time sequence, based on the injection pattern that has the least impact/crosstalk on the seismic and/or electromagnetic sensors.

If the seismic and electromagnetic excitations are injected at different moments, the duration of the recording period may depend on the nature of the injected excitation (i.e., whether it is a seismic or an electromagnetic excitation). Seismic and electromagnetic data corresponding to different measured quantities (sensors) may be separated using channel identification.

In some embodiments, the electromagnetic sensors may be configured to measure ground resistivity or polarizability by electric profiling or induced polarization. Seismic sensors may also capture passive seismic data.

Figure 6:
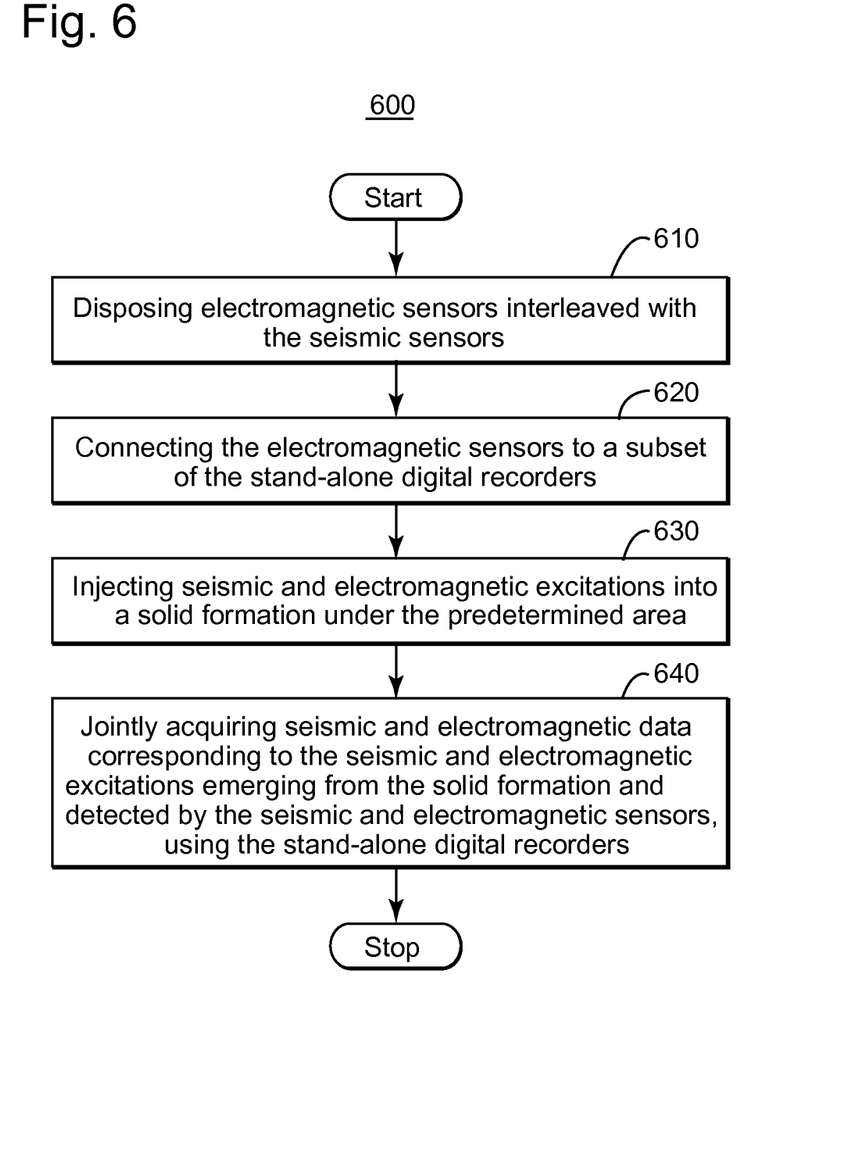
FIG. 6 is a flowchart of a method for retrofitting an existing seismic data acquisition system to convert it into a seismic and electromagnetic data acquisition system, according to an embodiment.

FIG. 6 is a flowchart of a method 600 for retrofitting an existing seismic data acquisition system to convert it into a seismic and electromagnetic data acquisition system. Thus, the seismic data acquisition system includes seismic sensors disposed in a predetermined area (e.g., above a hydrocarbon reservoir). The seismic sensors are connected to stand-alone digital recorders configured and connected to acquire seismic data received from the seismic sensors, respectively.

Method 600 includes disposing electromagnetic sensors interleaved with the seismic sensors at 610. Method 600 further includes connecting the electromagnetic sensors to a subset of the stand-alone digital recorders at 620. In one embodiment, new digital recorders are added as, for example, the digital recorders 125*a-c* in FIG. 1. In another embodiment, some of the stand-alone digital recorders are replaced by multichannel digital recorders to achieve, for example, a combination of digital recorders as illustrated in FIG. 2. In this case, the number of digital recorders in the data acquisition system is not changed, remaining equal to the number of seismic sensors.

Method 600 further includes injecting seismic and electromagnetic excitations into a solid formation under the predetermined area, at 630. Method 600 then includes jointly acquiring seismic and electromagnetic data corresponding to the seismic and electromagnetic excitations emerging from the solid formation and detected by the seismic and electromagnetic sensors, using the stand-alone digital recorders, at 640. The disposing, the connecting, the injecting and/or the acquiring steps of method 600 is/are performed such that to minimize a seismic-electromagnetic cross-response.

In areas of interest (e.g., above a hydrocarbon reservoir), the seismic and electromagnetic sensors may be kept in place for long time periods, to optimize time-lapse data acquisition.

The disclosed exemplary embodiments provide methods and devices for joint seismic and electromagnetic data recording. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for exploring an underground formation, the method comprising:
    disposing seismic sensors and electromagnetic sensors according to a predetermined two-dimensional arrangement over the underground formation;
    connecting the seismic and the electromagnetic sensors to stand-alone digital recorders; and
    acquiring jointly seismic and electromagnetic data due to excitations injected in the underground formation, by the stand-alone digital recorders, from the seismic and the electromagnetic sensors, so as at least one of the stand-alone digital recorders to record both the seismic data and the electromagnetic data from one of the seismic sensors and one of the electromagnetic sensor disposed close to one another,
    wherein at least one of the disposing, connecting and acquiring are performed such that to minimize a seismic-electromagnetic cross-response.

2. The method of claim 1, wherein the seismic sensors are non-inductive seismic sensors.

3. The method of claim 2, wherein the seismic sensors are hydrophones, micro electro-mechanical system (MEMS) accelerometers, distributed acoustic sensor systems (DAS), fiber optic sensors or a combination thereof.

4. The method of claim 1, wherein the electromagnetic sensors are grounded electrodes, inductive coils, fluxgate magnetometers, capacitive electrodes or a combination thereof.

5. The method of claim 1, wherein, according to the predetermined arrangement, the seismic and the electromagnetic sensors interleaved along lines of a same grid.

6. The method of claim 1, wherein the seismic-electromagnetic response includes at least one of a seismic sensor response to an electromagnetic excitation and an electromagnetic sensor response to a seismic excitation.

7. The method of claim 1, wherein the stand-alone digital recorders are configured to communicate wirelessly.

8. The method of claim 1, further comprising:
    generating seismic and electromagnetic excitations such that corresponding listening times thereof overlap at least partially.

9. The method of claim 1, wherein the stand-alone digital recorders are configured to record continuously.

10. The method of claim 1, further comprising:
    transferring the seismic and electromagnetic data from the stand-alone digital recorders to a central unit; and
    assembling the seismic and electromagnetic data into a dataset.

11. The method of claim 1, wherein the electromagnetic sensors are connected to multichannel digital recorders among the stand-alone digital recorders.

12. The method of claim 11, wherein the multichannel digital recorders are configured and connected to record jointly a subset of the electromagnetic data related to two of the electromagnetic sensors and a subset of the seismic data received from one of the seismic sensors.

13. The method of claim 1, wherein the electromagnetic sensors measure ground resistivity or polarizability by electric profiling or induced polarization.

14. The method of claim 1, wherein the seismic and electromagnetic sensors are disposed on or buried under the seafloor.

15. A seismic and electromagnetic data acquisition system, comprising:
    seismic sensors and electromagnetic sensors disposed according to a predetermined two dimensional arrangement over a predetermined area; and
    a nodal recording system connected to the seismic sensors and to the electromagnetic sensors and configured to acquire jointly seismic and electromagnetic data corresponding to a seismic response and to an electromagnetic response of a same underground formation beneath the predetermined area, which responses are caused by a seismic excitation and an electromagnetic excitation, respectively, so as a stand-alone digital recorder of the nodal recording system to record both the seismic data and the electromagnetic data from one of the seismic sensors and one of the electromagnetic sensor disposed close to one another, wherein the seismic and electromagnetic data acquisition system is configured and operated to minimize a seismic-electromagnetic cross-response in the jointly acquired seismic and electromagnetic data.

16. The system of claim 15, wherein the seismic sensors are non-inductive seismic sensors.

17. The system of claim 15, wherein the nodal recording system is made of stand-alone digital recorders.

18. The system of claim 17, wherein the electromagnetic sensors are connected to multichannel digital recorders among the stand-alone digital recorders, each of the multichannel digital recorders being also connected to one of the seismic sensors, and being configured and connected to record the electromagnetic data related to two electromagnetic signals.

19. The system of claim 15, wherein the seismic and electromagnetic sensors are configured to operate while disposed on or buried under the seafloor.

20. A method for retrofitting a seismic data acquisition system including seismic sensors disposed in a predetermined area and connected to stand-alone digital recorders, the method comprising:

disposing electromagnetic sensors interleaved with the seismic sensors in a two-dimensional grid;

connecting the electromagnetic sensors to a subset of the stand-alone digital recorders;

injecting seismic and electromagnetic excitations into a solid formation under the predetermined area; and jointly acquiring seismic and electromagnetic data corresponding to the seismic and electromagnetic excitations emerging from the solid formation and detected by the seismic and electromagnetic sensors, using the stand-alone digital recorders, so as at least one of the stand-alone digital recorders to record both the seismic data and the electromagnetic data from one of the seismic sensors and one of the electromagnetic sensor disposed close to one another, wherein at least one of the disposing, connecting, injecting and acquiring are performed such that to minimize a seismic-electromagnetic cross-response.

\* \* \* \* \*